(12) United States Patent
Zhao et al.

(10) Patent No.: US 10,113,699 B2
(45) Date of Patent: Oct. 30, 2018

(54) LED BULB HAVING LIGHT GUIDE BODY

(71) Applicant: Changzhou Fuxing Electrical Appliance Co., Ltd., Changzhou (CN)

(72) Inventors: Huanxing Zhao, Changzhou (CN); Shenhong Wang, Changzhou (CN)

(73) Assignee: Changzhou Fuxing Electrical Appliance Co., Ltd., Changzhou (CN)

( * ) Notice: Subject to any disclaimer, the term of this patent is extended or adjusted under 35 U.S.C. 154(b) by 0 days.

(21) Appl. No.: 15/821,332

(22) Filed: Nov. 22, 2017

(65) Prior Publication Data

US 2018/0094780 A1    Apr. 5, 2018

(30) Foreign Application Priority Data

Aug. 16, 2017  (CN) .......................... 2017 1 0701221

(51) Int. Cl.
| | |
|---|---|
| *F21K 9/61* | (2016.01) |
| *F21V 29/70* | (2015.01) |
| *F21K 9/238* | (2016.01) |
| *F21K 9/232* | (2016.01) |
| *F21K 9/235* | (2016.01) |
| *F21V 23/06* | (2006.01) |
| *F21V 8/00* | (2006.01) |
| *F21W 121/00* | (2006.01) |
| *F21Y 105/10* | (2016.01) |
| *F21Y 115/10* | (2016.01) |

(Continued)

(52) U.S. Cl.
CPC ................ *F21K 9/61* (2016.08); *F21K 9/232* (2016.08); *F21K 9/235* (2016.08); *F21K 9/238* (2016.08); *F21V 23/06* (2013.01); *F21V 29/70* (2015.01); *F21W 2121/00* (2013.01); *F21Y 2103/33* (2016.08); *F21Y 2105/10* (2016.08); *F21Y 2113/20* (2016.08); *F21Y 2115/10* (2016.08); *G02B 6/0033* (2013.01)

(58) Field of Classification Search
CPC . F21K 9/61; F21K 9/238; F21K 9/232; F21K 9/235; F21V 29/70; F21V 23/06
See application file for complete search history.

(56) References Cited

U.S. PATENT DOCUMENTS

| | | | |
|---|---|---|---|
| 2010/0148650 A1* | 6/2010 | Wu ........................... | F21V 3/02 313/1 |
| 2011/0037386 A1* | 2/2011 | Lee ........................... | F21V 3/00 315/35 |

(Continued)

OTHER PUBLICATIONS

U.S. Appl. No. 29/645,705, filed Apr. 27, 2018, Huanxing Zhao.

*Primary Examiner* — Bao Q Truong
(74) *Attorney, Agent, or Firm* — Gokalp Bayramoglu

(57) ABSTRACT

The invention discloses an LED bulb having a light guide body, including a bulb holder, a bulb shell, a luminous body, a power source, a connector, and a light guide body. The connector is fixedly connected to the bulb holder, the bulb shell is fixed on the connector, the luminous body and the power source are located in the bulb holder, the luminous body and the power source are connected by using a wire, a lower end of the light guide body is plugged with the connector, and a bottom of the light guide body is in contact with the luminous body, where the light guide body is engraved with glyphs. The LED bulb having a light guide body of the invention can both provide light and have a decorative effect.

15 Claims, 4 Drawing Sheets

(51) Int. Cl.
*F21Y 103/33* (2016.01)
*F21Y 113/20* (2016.01)

(56) References Cited

U.S. PATENT DOCUMENTS

| | | | |
|---|---|---|---|
| 2012/0134171 A1* | 5/2012 | Ye | F21K 9/61 362/560 |
| 2016/0178139 A1* | 6/2016 | Ansems | F21K 9/52 362/611 |
| 2016/0258579 A1* | 9/2016 | Dulley | G02B 6/0003 |

* cited by examiner

LED BULB HAVING LIGHT GUIDE BODY

CROSS-REFERENCE TO RELATED APPLICATION

This application claims the benefit of and priority to Chinese Patent Application No: 201710701221.5 filed on Aug. 16, 2017, the disclosure of which is hereby incorporated herein by reference in its entirety.

BACKGROUND

Technical Field

The invention relates to an LED bulb having a light guide body, and belongs to the field of lighting technologies.

Related Art

At present, lighting bulbs commonly used in the market are mostly formed by patches or strips of incandescent bulbs and ordinary LED bulbs. The incandescent bulbs have a filament support in a bulb shell, and glow by using a filament on the filament support. The incandescent bulbs have disadvantages of a short life of a filament, a complex production process, high manufacture costs, and low production efficiency. The ordinary LED bulbs have the similar production process manufacture problem, and also cannot achieve a decorative effect of the incandescent bulbs. Therefore, people use an LED bulb having a light guide body. A bottom of the light guide body is in contact with a luminous body, and depending on total internal reflection, light is transmitted in the light guide body. The light guide body is generally made of optical materials such as acrylic polyester, polycarbonate, epoxy resin, and glass. A light guide effect of the light guide body made of the foregoing materials is still unsatisfactory, and a lighting effect is affected. Some can only be used as decorative bulbs, and cannot reach a lighting requirement.

SUMMARY

An objective of the invention is to provide an LED bulb that has a light guide body and that can both provide light and have a decorative effect.

To resolve the foregoing technical problem, the technical solutions of the invention are:

An LED bulb having a light guide body includes a bulb holder, a bulb shell, a luminous body, a power source, a connector, and a light guide body. The connector is fixedly connected to the bulb holder, the bulb shell is fixed on the connector, the luminous body and the power source are located in the bulb holder, the luminous body and the power source are connected by using a wire, a lower end of the light guide body is plugged with the connector, and a bottom of the light guide body is in contact with the luminous body, where the light guide body is engraved with glyphs.

Further, the light guide body is a cylinder, and an outer wall of the light guide body is engraved with spiral glyphs.

Further, the light guide body is a cylinder, and an outer wall of the light guide body is engraved with glyphs arranged in a V shape.

Further, a top of the light guide body is in a wavy shape.

Further, the luminous body is an LED luminous body.

Further, a top of the light guide body is in a rhombus shape.

Further, outer threads are disposed with on the connector, and the bulb shell and the connector are connected by using the threads.

Further, a first fastener used for connecting to the light guide body is disposed inside the connector.

Further, a second fastener is disposed inside the connector, and a heat dissipation piece connected to the second fastener is disposed inside the bulb holder.

After the foregoing technical solutions are used, because a light guide body is engraved with glyphs, light glow and light guide effects may be enhanced by using the glyphs, to ensure that the lightness reaches a lighting requirement. At the same time, the glyphs can further have a decorative effect. Compared with an incandescent bulb, a service life of a bulb is prolonged, and compared with an ordinary LED bulb, a manufacture process is simplified, and manufacture costs are reduced. In addition, a top of the light guide body is in a wavy shape or a rhombus shape, and may have a light gathering effect, thereby resolving a problem of glowing at the top of the light guide body, and making the entire bulb body glow evenly and softly.

In the figures, 1. Power source, 2. Second fastener, 3. Luminous body, 4. Light guide body, 5. Glyphs, 6. Bulb shell, 7. Connector, 8. First fastener, 9. Heat dissipation piece, 10. Bulb holder.

DETAILED DESCRIPTION

To make the content of the invention understood more easily, the following further describes the invention in detail according to specific embodiments and with reference to the accompanying drawings.

Embodiment 1

Figure 1:
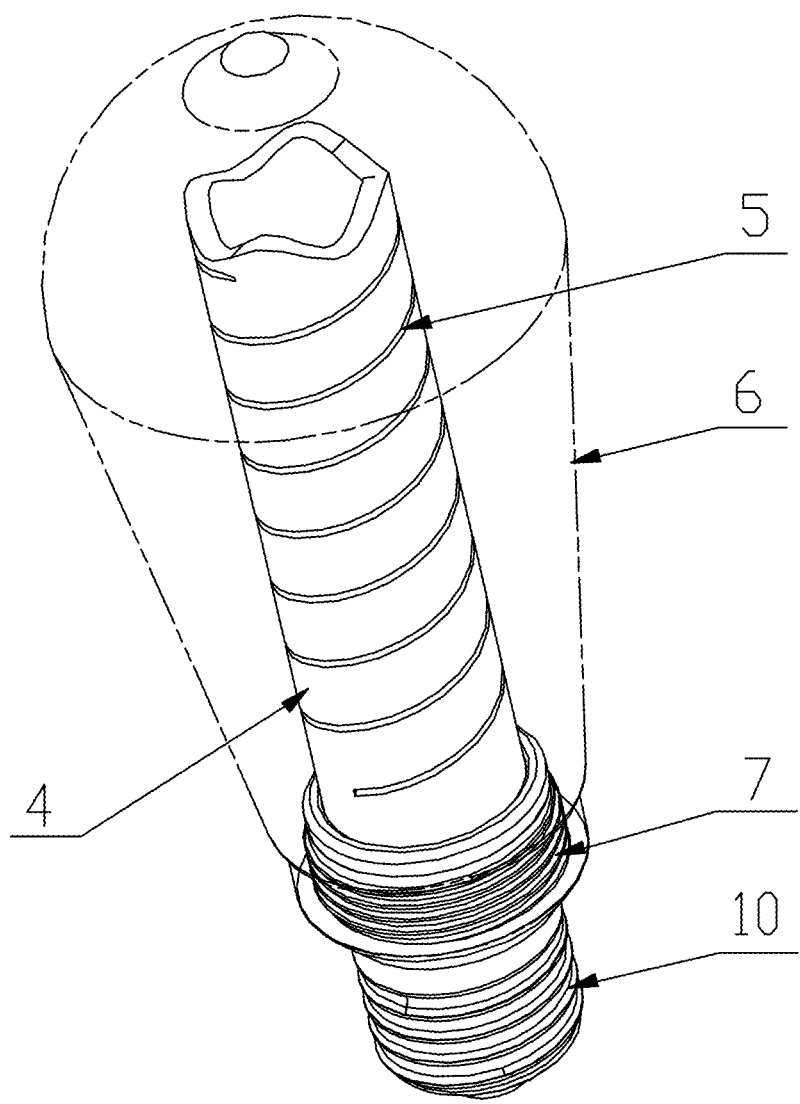
FIG. 1 is a three-dimensional view of a first structure of an LED bulb having a light guide body according to the invention.
Figure 2:
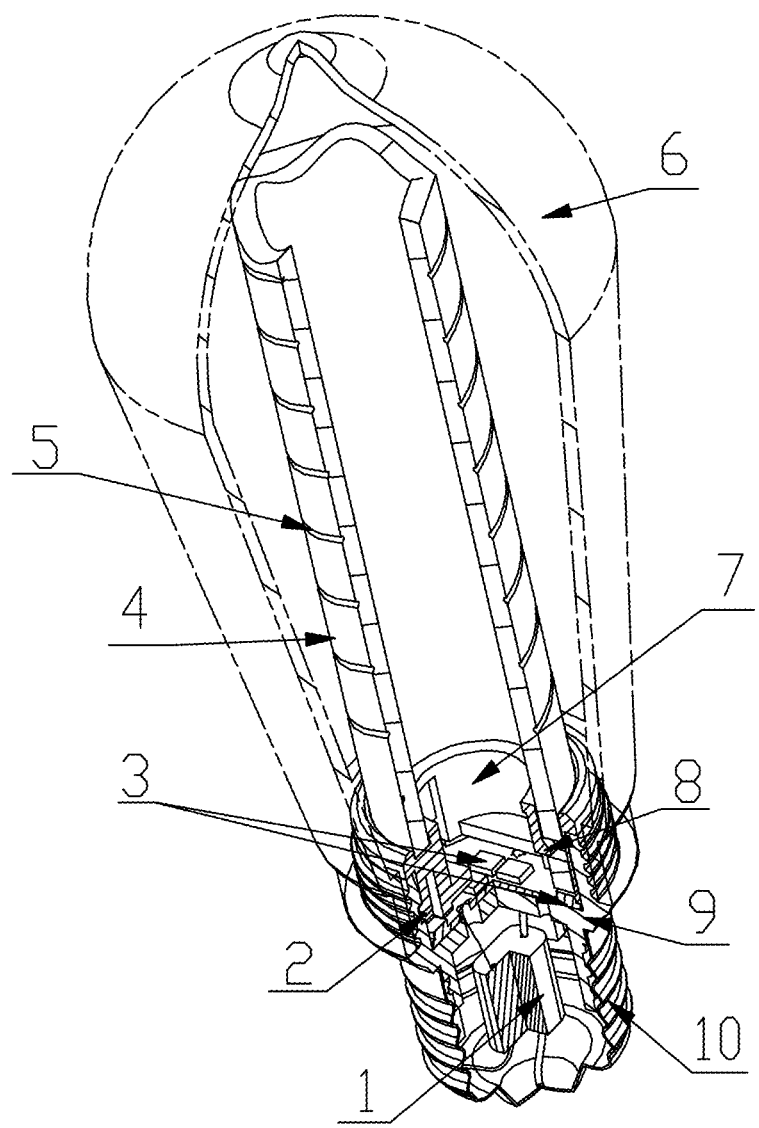
FIG. 2 is a schematic sectional view of FIG. 1.

As shown in FIG. 1 and FIG. 2, an LED bulb having a light guide body includes a bulb holder 10, a bulb shell 6, a luminous body 3, a power source 1, a connector 7, and a light guide body 4. The connector 7 is fixedly connected to the bulb holder 10, the bulb shell 6 is connected to the connector 7 by using threads, the luminous body 3 and the power source 1 are located in the bulb holder 10, the luminous body 3 is an LED luminous body, and the luminous body 3 and the power source 1 are connected by using a wire. A lower end of the light guide body 4 is plugged with the connector 7, and a bottom of the light guide body 4 is in contact with the luminous body 3. The light guide body 4 is a cylinder, the light guide body 4 is engraved with spiral glyphs 5, and a top of the light guide body 4 is in a wavy shape. The top of the light guide body 4 may also be in a rhombus shape. The top of the light guide body 4 uses the wavy shape or the rhombus shape and may have a light gathering effect, thereby resolving a problem of glowing at the top of the light guide body 4, and making the entire bulb body glow evenly and softly.

As shown in FIG. 2, a first fastener 8 used for connecting to the light guide body 4 is disposed inside the connector 7. The first fastener 8 facilitates the connection between the light guide body 4 and the connector 7, and may ensure close connection between them, without generating a shaking phenomenon.

As shown in FIG. 2, a second fastener 2 is disposed inside the connector 7, and a heat dissipation piece 9 connected to the second fastener 2 is disposed in the bulb holder 10. The heat dissipation piece 9 is configured to dissipate heat inside the bulb holder 10, and prevent excessively high temperature in the bulb holder 10.

Embodiment 2

Figure 3:
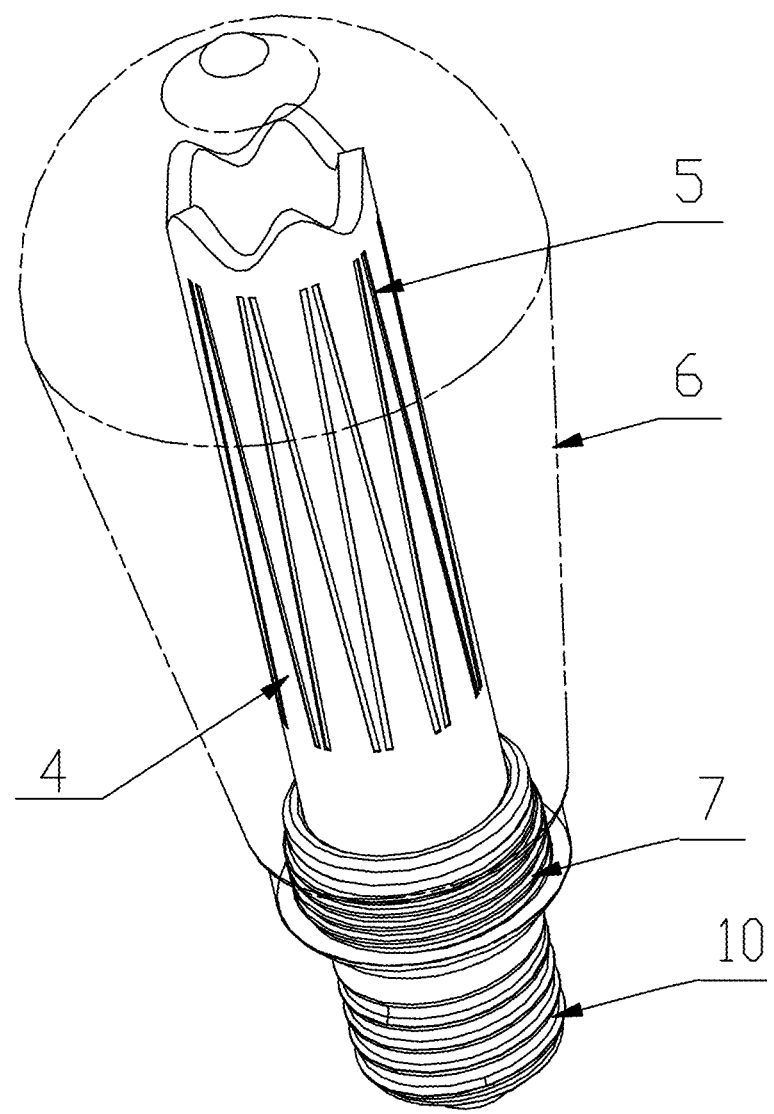
FIG. 3 is a three-dimensional view of a second structure of an LED bulb having a light guide body according to the invention.
Figure 4:
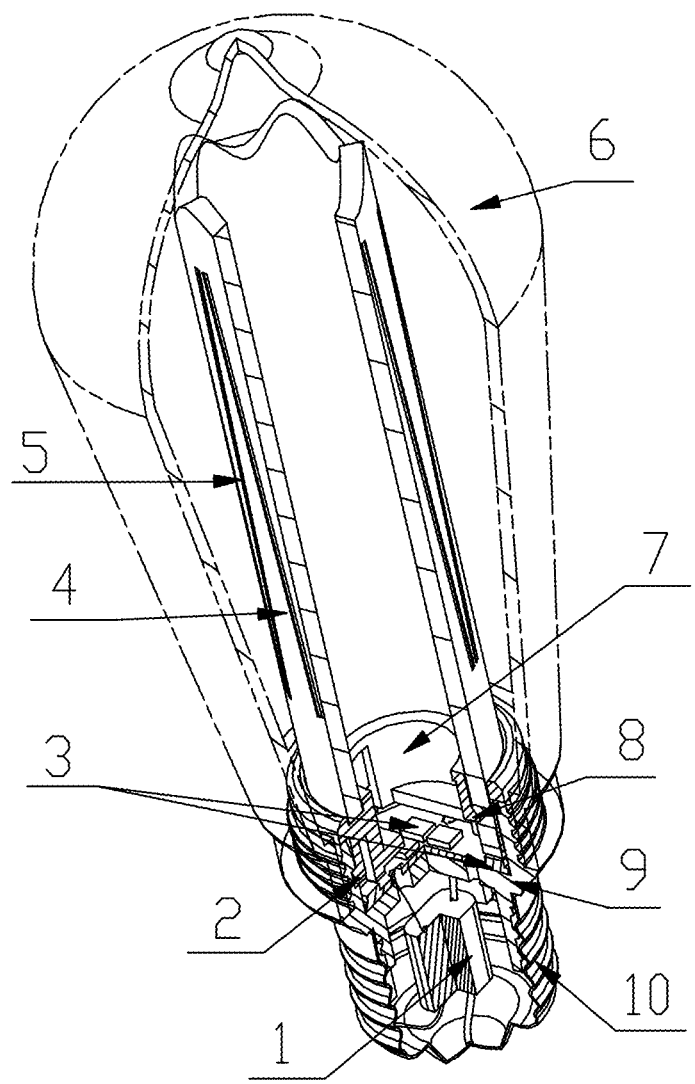
FIG. 4 is a schematic sectional view of FIG. 3.

As shown in FIG. 3 and FIG. 4, an LED bulb having a light guide body includes a bulb holder 10, a bulb shell 6, a luminous body 3, a power source 1, a connector 7, and a light guide body 4. The connector 7 is fixedly connected to the bulb holder 10, the bulb shell 6 is connected to the connector 7 by using threads, the luminous body 3 and the power source 1 are located in the bulb holder 10, the luminous body 3 is an LED luminous body, and the luminous body 3 and the power source 1 are connected by using a wire. A lower end of the light guide body 4 is plugged with the connector 7, and a bottom of the light guide body 4 is in contact with the luminous body 3. The light guide body 4 is a cylinder, the light guide body 4 is engraved with glyphs 5 arranged in a V shape, and a top of the light guide body 4 is in a wavy shape. The top of the light guide body 4 may also be in a rhombus shape. The top of the light guide body 4 uses the wavy shape or the rhombus shape, and may have a light gathering effect, thereby resolving a problem of glowing at the top of the light guide body 4, and making the entire bulb body glow evenly and softly.

As shown in FIG. 4, a first fastener 8 used for connecting to the light guide body 4 is disposed inside the connector 7. The first fastener 8 facilitates the connection between the light guide body 4 and the connector 7, and may ensure close connection between them, without generating a shaking phenomenon.

As shown in FIG. 4, a second fastener 2 is disposed inside the connector 7, and a heat dissipation piece 9 connected to the second fastener 2 is disposed in the bulb holder 10. The heat dissipation piece 9 is configured to dissipate heat inside the bulb holder 10, to prevent excessively high temperature in the bulb holder 10.

The foregoing specific embodiments further describe the objective, the technical solutions, and the beneficial effect of the invention in detail. It should be understood that, the foregoing descriptions are only specific embodiments of the invention, and are not used for limiting the invention. Any modifications, equivalent replacements, improvements made without departing from the spirit and principle of the invention shall all fall within the protection scope of the invention. Particularly, the form of glyphs is not limited to be arranged in the thread shape in Embodiment 1 and the V shape in Embodiment 2. The shape of a light guide body is also not limited to a cylinder, and may also be in rhombus, square, and strip shapes, or may be made into a light guide plate. In addition to the spiral shape and the V shape, the glyphs may also be shapes of other forms.

What is claimed is:

1. An LED bulb having a light guide body, comprising a bulb holder, a bulb shell, a luminous body, a power source, a connector, and a light guide body; wherein the connector is fixedly connected to the bulb holder;

the bulb shell is fixed on the connector;

the luminous body and the power source are located in the bulb holder;

the luminous body and the power source are connected by using a wire;

a lower end of the light guide body is plugged with the connector;

a bottom of the light guide body is in contact with the luminous body;

the light guide body has an opening at the top;

a contour line of the opening has a wavy shape; and the light guide body is engraved with glyphs.

2. The LED bulb having a light guide body according to claim 1, wherein the light guide body is a cylinder and an outer wall of the light guide body is engraved with spiral concave glyphs.

3. The LED bulb having a light guide body according to claim 1, wherein the light guide body is a cylinder, and an outer wall of the light guide body is engraved with glyphs arranged in a V shape.

4. The LED bulb having a light guide body according to claim 1, wherein the luminous body is an LED luminous body.

5. The LED bulb having a light guide body according to claim 1, wherein outer threads are disposed on the connector, and the bulb shell and the connector are connected by using the threads.

6. The LED bulb having a light guide body according to claim 1, wherein a first fastener used for connecting to the light guide body is disposed inside the connector.

7. The LED bulb having a light guide body according to claim 1, wherein a second fastener is disposed inside the connector, and a heat dissipation piece-connected to the second fastener is disposed in the bulb holder.

8. The LED bulb having a light guide body according to claim 2, wherein the luminous body is an LED luminous body.

9. The LED bulb having a light guide body according to claim 2, wherein outer threads are disposed on the connector, and the bulb shell and the connector are connected by using the threads.

10. The LED bulb having a light guide body according to claim 2, whe a first fastener used for connecting to the light guide body is disposed inside the connector.

11. The LED bulb having a light guide body according to claim 2, wherein a second fastener is disposed inside the connector, and a heat dissipation piece connected to the second fastener is disposed in the bulb holder.

12. The LED bulb having a light guide body according to claim 3, wherein the luminous body is an LED luminous body.

13. The LED bulb having a light guide body according to claim 3, wherein outer threads are disposed on the connector, and the bulb shell and the connector are connected by using the threads.

14. The LED bulb having a light guide body according to claim 3, wherein a first fastener used for connecting to the light guide body is disposed inside the connector.

15. The LED bulb having a light guide body according to claim 3, wherein a second fastener is disposed inside the connector, and a heat dissipation piece connected to the second fastener is disposed in the bulb holder.

* * * * *